Sept. 22, 1959 C. P. SEVIGNY 2,905,112
CANDY CUTTER
Filed July 27, 1956 4 Sheets-Sheet 3
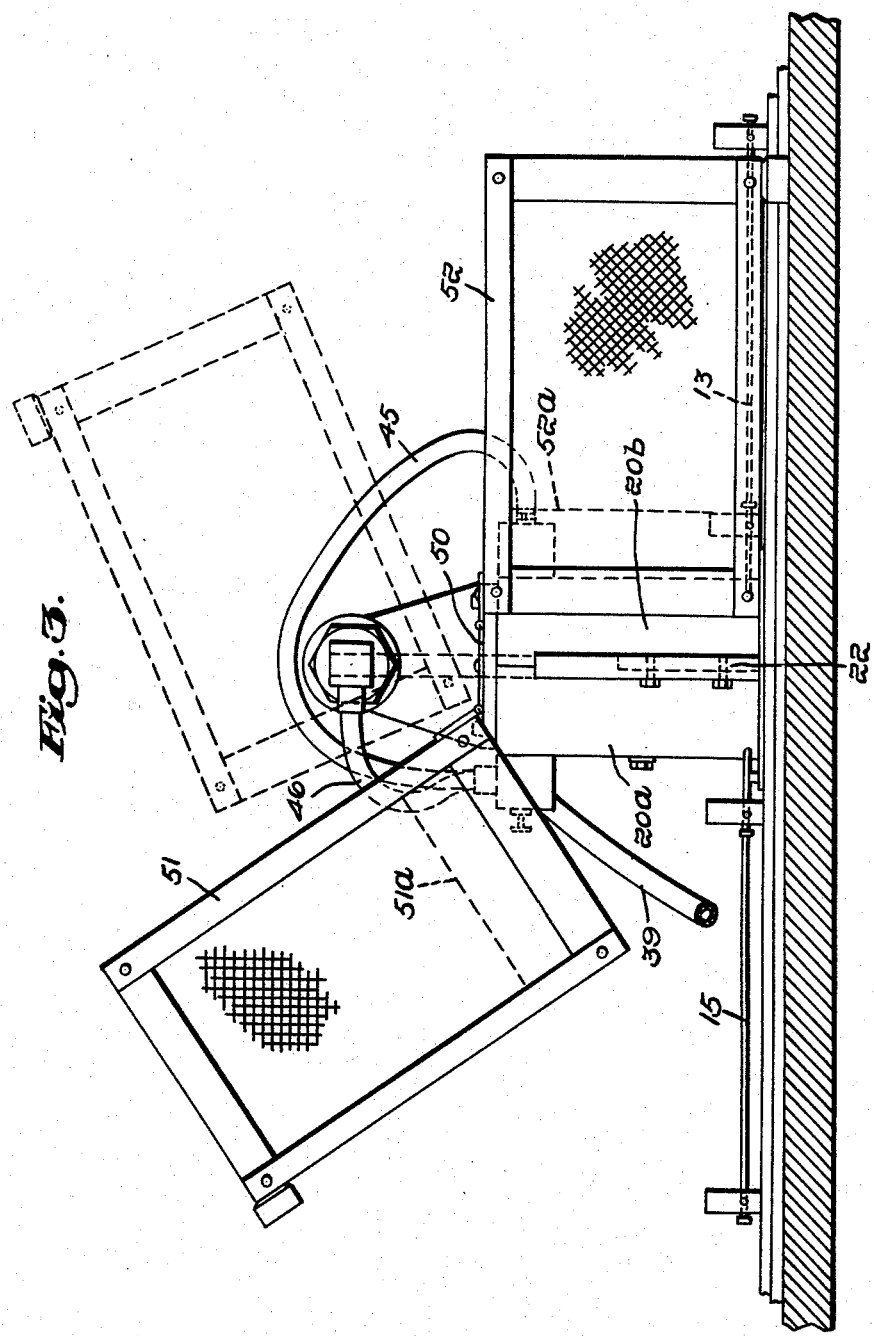
Inventor:
Charles P. Sevigny
by Robert D. Thomson
Attorney

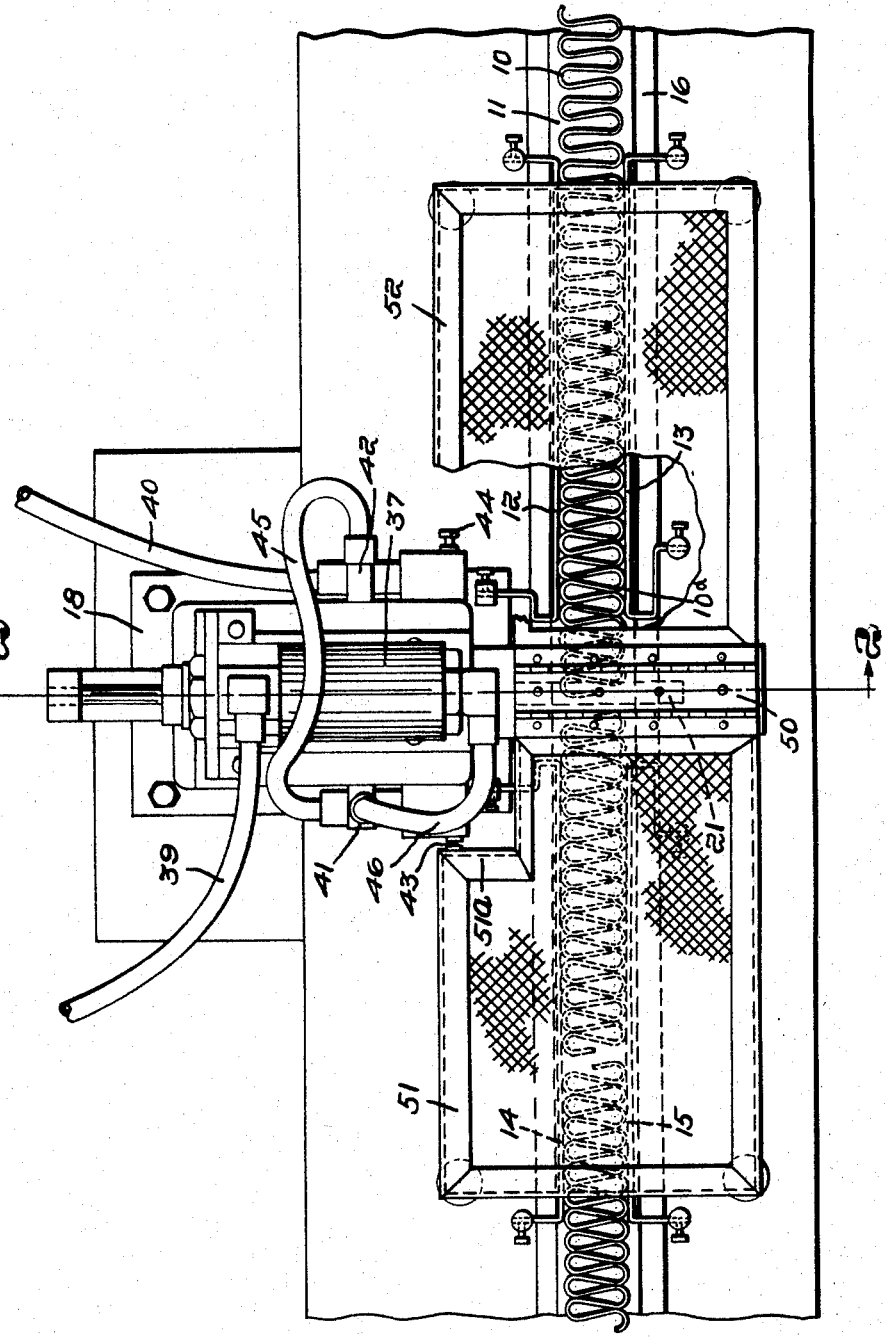

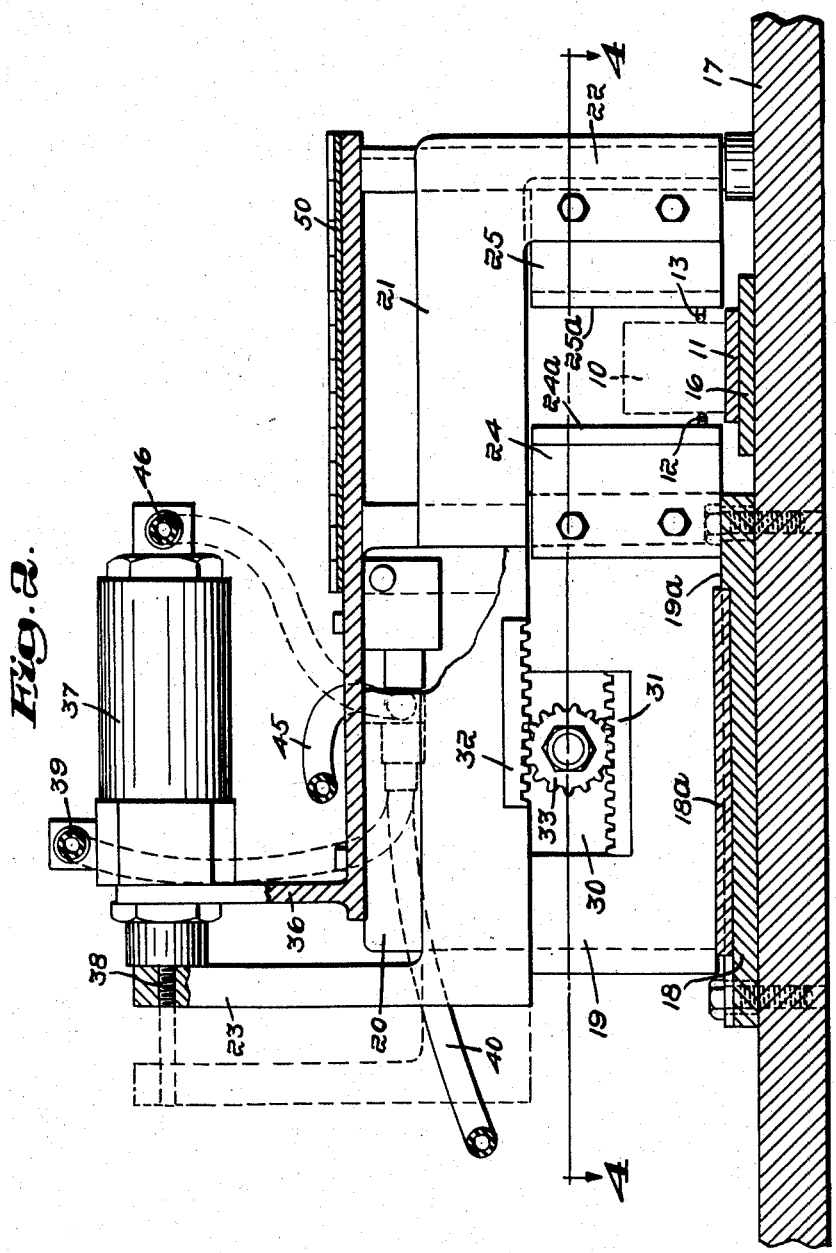

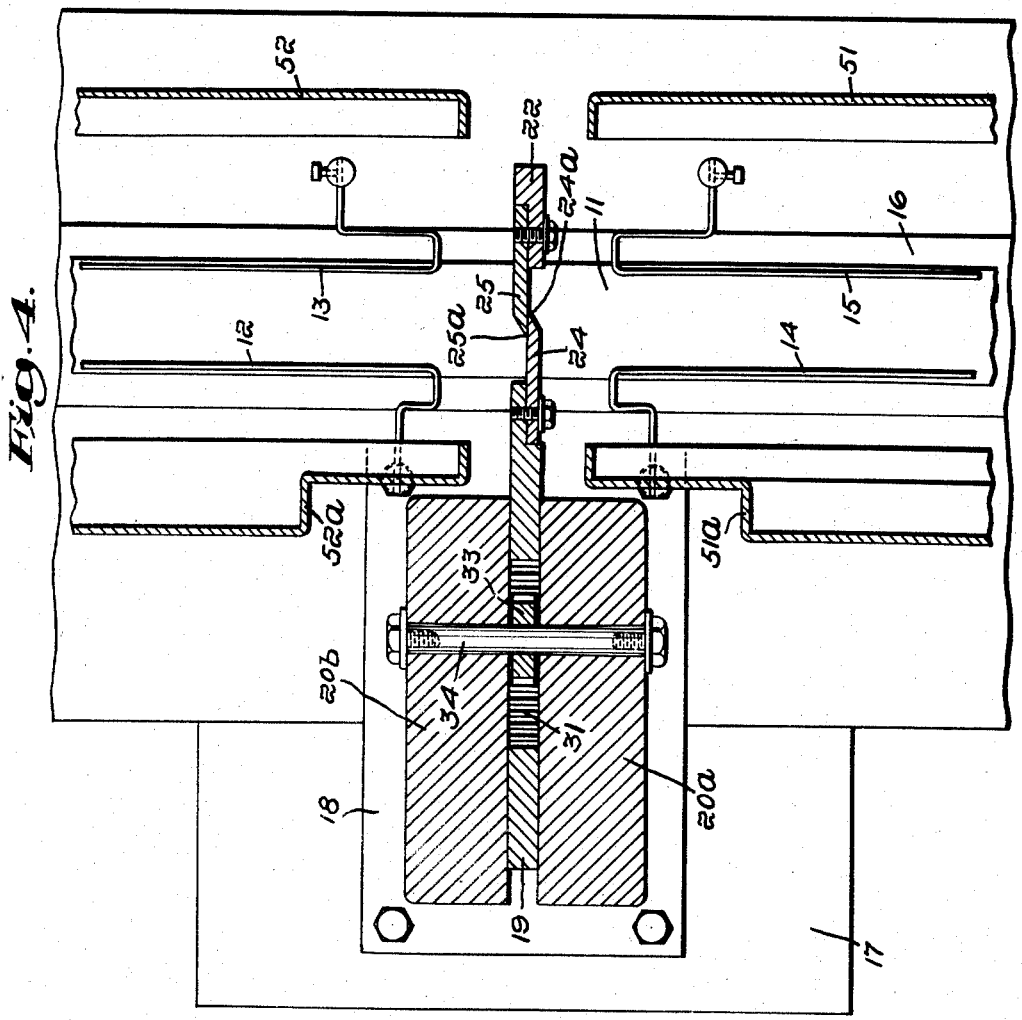

United States Patent Office 2,905,112
Patented Sept. 22, 1959

2,905,112

CANDY CUTTER

Charles P. Sevigny, West Hanover, Mass.

Application July 27, 1956, Serial No. 600,421

8 Claims. (Cl. 107—21)

This invention relates to devices for cutting long strips of candy or similar materials, especially delicate material such as ribbon candy, into lengths suitable for packing. The device here disclosed, although suitable for cutting a strip of candy which is stationary during the cutting operation, has special advantages for cutting a moving strip emerging from a continuous production type of candy making machine.

Ribbon candy must be cut into lengths suitable for packing while still warm and flexible because it becomes extremely brittle when cool. The principal object of this invention is to produce a cutting device which will cut a continuously moving or stationary ribbon into uniform lengths without sticking, tearing, or distorting the ribbon in the region of the cut. Other objects are to produce a cutter which is simple to install, is reliable, and is safe in operation.

The cutter here described is intended to be mounted alongside a conveyor belt, and consists, in general, of a pair of knife blades arranged to reciprocate toward and away from each other transversely across the conveyor, a pneumatic cylinder drive and linkage for advancing and retracting the knives in synchronization, and guides for maintaining the advancing ribbon of candy in proper position for cutting. The operation of the cylinder is timed according to the length of pieces desired. The machine has appropriate control valves for operating the pneumatic cylinder and is equipped with shields to prevent entry of the operator's hand, and safety devices for shutting off the cylinder when the shields are open.

In the drawings illustrating the invention:

Fig. 1 is a plan view of a cutting device constructed according to the invention;

Fig. 2 is a transverse cross-section taken along lines 2—2 of Fig. 1;

Fig. 3 is a side elevation of the cutting device showing one of the shields in open position; and Fig. 4 is an enlarged fragmentary cross-section taken along line 4—4 of Fig. 2.

A continuous strip of crimped ribbon candy 10 which is to be cut is supported on a conveyor belt 11 which is illustrated in Fig. 1 as continuously moving from right to left. A pair of parallel guide wires 12 and 13, supported by posts at the sides of the belt, serve to center the strip 10 and hold it straight as it enters the cutter. Similar guide wires 14 and 15 guide the cut pieces as they emerge from the cutter. The belt 11 slides over a flat plate 16 supported on a table 17 on which a base plate 18 and frame 20 of the cutter are supported. A first knife carrier 19 is slidably received between the two side walls 20a and 20b of the frame 20. A key 18a engages a shoulder 19a on the bottom of carrier 19 to act as a stop to limit outward travel of the carrier. A second knife carrier 21, having a downwardly extending arm 22 and an upwardly extending arm 23, is slidably mounted above carrier 19 between walls 20a and 20b.

These carriers are disposed to reciprocate transversely across the belt. A knife blade 24, having a cutting edge 24a is attached to carrier 19, and a knife blade 25, having a cutting edge 25a, is attached to arm 22 of carrier 21. These blades are disposed vertically just above the belt 11, and, in open position, are spaced apart to permit free passage of the candy strip 10, as shown in Fig. 2. The blades are longitudinally offset so that their cutting edges will just pass one another when the blades are brought into cutting position, as shown in Fig. 4.

Carrier 19 has a recess 30 at the bottom of which is mounted a rack 31. Another rack 32 is mounted on the under side of carrier 21. A pinion 33, journalled on a shaft 34 which is mounted on walls 20a and 20b, engages both racks. By means of this connection, reciprocating movement of carrier 21 causes carrier 19 to be simultaneously reciprocated in the opposite direction.

Mounted on top of frame 20 is a bracket 36 on which is mounted a pneumatic cylinder 37 which may be of any conventional quick-acting type of suitable stroke length and capacity. Arm 23 is attached to the piston rod 38 of this cylinder. Compressed air from any convenient source is supplied to one end of the cylinder through air hose 39 and to the other end through air hose 40. Hoses 39 and 40 are connected to a suitable control mechanism (not shown), for example a four-way valve operated by an adjustable electric timer.

The candy as it emerges from the crimper is rather loosely crimped. It is usually desirable to have a tighter crimp in the finished pieces. This can be accomplished readily, by means of this device, by suitable adjustment of the timer which determines the operating cycle of the pneumatic cylinder. If the cylinder is operated so that the knives, after closing, will dwell in the closed positions, the candy moving into the cutter will be compressed lengthwise until successive loops touch one another. The candy nearest to the blades will tighten up first, and the tightening effect will progress back along the strip until the knives are opened. The dwell of the knives in the closed positions can be regulated in relationship to the speed of the conveyor so that a piece of the desired length is tightened up during this part of the operating cycle of the cutter. When the blades open, the candy strip again starts to pass the cutter. By suitable regulation of the dwell of the blades in the open position, the length of the piece which will be cut off when the blades close again can be varied, as desired. Ordinarily it is desirable to adjust the cylinder cycle so that the length of the part 10a, of the entering strip, which becomes tightly crimped during the "closed" dwell period of the knives, corresponds to the length which passes through during the "open" dwell period, and thus to the length of the finished cut pieces. The proper timing for a particular conveyor installation can be readily determined by a few trials.

A pair of valves 41 and 42, which are operated, respectively, by push buttons 43 and 44, are mounted one on either side of the cylinder. These valves are of the normally closed type and are open only when the push buttons are depressed. Hose 40 is connected to valve 42, which is, in turn, connected through a hose 45 to valve 41. A hose 46 connects valve 41 to the cylinder. Valves 41 and 42 are thus connected in series in the air line which supplies cylinder 37 on the advance stroke of the piston. Consequently, the piston cannot be advanced unless both of these valves are open.

Extending over the belt from the top of frame 20 is a top plate 50, to either side of which are hinged guards 51 and 52 having an approximately rectangular shape and a channel-shaped frame member supporting a screen inhibiting access to the cutters. These guards are open at the ends, but are long enough to prevent an operator from inserting his hand into the device from either end as far as the cutters, without raising one of the guards. The guards have shoulders 51a and 52a (Fig. 4) which engage push buttons 43 and 44 to hold valves 41 and 42 open when the guards are down. When either guard is lifted, the valve which it controls is closed, thus shutting off air to hose 46 so that the cylinder will not operate to advance the piston.

When the cutter is in operating condition, with the guards down, a strip of candy on belt 11 will pass continually into the cutter. The piston rod 38 will be periodically rapidly advanced, thus bringing the knife blades rapidly together to cut the strip. As the piston is driven with a quick return motion, the knives are retracted immediately and only momentarily interrupt the forward motion of the candy strip. A crimped strip will thus not be appreciably distorted. The rapid chopping action of the blades produces a clean cut. The length of the cut pieces depends on the correlation of the timing of the piston stroke and the speed of the belt, and can be varied, as desired, by controlling either of these factors.

What is claimed is:

1. A device for cutting a long strip of candy into shorter lengths, comprising means for supporting the strip, a base member mounted alongside said strip supporting means, first and second carrier members slidably mounted, one above the other, on said base member, the upper of said carrier members having a downwardly extending arm on which a first knife blade is mounted, and the lower member having mounted thereon a second knife blade disposed at the level of the first blade, and means for reciprocating said carrier members simultaneously in opposite directions so as to carry said blades toward and away from each other between an open and closed position, the carrier members and blades being disposed above and movable across said supporting means, the blades being disposed, when in said open position, to permit free passage between them of a strip on said supporting means and being arranged to engage and cut the strip between them when they move to said closed position.

2. A device as described in claim 1, the means for reciprocating said carriers comprising a fluid operated cylinder having a piston rod connected to the upper carrier, a rack on the upper carrier facing downward, a rack on the lower carrier facing upward, and a pinion engaging both racks.

3. A device for cutting a strip of loosely crimped candy strip on a continuously traveling conveyor which moves the strip along a predetermined path, comprising a pair of knife blades disposed transversely with respect to said path, means for reciprocating said blades toward and away from each other across said path between an open and a closed position and causing said blades to dwell in the closed position, the conveyor being freely movable past said blades when the blades are in either their open or their closed position, and the blades being engageable with said strip when in their closed position whereby the strip will be compressed lengthwise and successive loops thereof will be pressed together, and means for guiding said strip to pass between the blades when the latter are in the open position.

4. A device as described in claim 3, having a pair of guard members disposed normally to prevent access to the knives by an operator's hand while permitting passage of the strip, and movable to an open position, the device having means for preventing movement of the blades to their closed position when either of the guard members is in its open position.

5. A device for cutting a strip of candy supported on a conveyor, comprising a first knife carrier mounted alongside said conveyor, a second knife carrier mounted above the first and extending transversely across said conveyor, said second carrier having a downwardly extending arm spaced transversely across the conveyor from the first carrier, said carriers being mounted to slide back and forth transversely above the conveyor, a first knife blade mounted on said first carrier, a second knife blade mounted on said arm, and drive means adapted to reciprocate said carriers simultaneously in opposite directions so as to cause said blades alternately to close together across the conveyor and to open to a position in which said strip may pass between them.

6. A device as described in claim 5, said drive means comprising a fluid operated cylinder having a piston rod disposed to reciprocate parallel to the direction of motion of the carriers and attached to said second carrier, a pair of racks, one mounted on each of said carriers, and a pinion engaging both said racks.

7. A device for cutting a strip of candy supported on a conveyor, comprising a first knife carrier mounted alongside said conveyor, a second knife carrier mounted above the first and extending transversely across said conveyor, said second carrier having a downwardly extending arm spaced transversely across the conveyor from the first carrier, said carriers being mounted to slide back and forth transversely with respect to the conveyor, a first knife blade mounted on said first carrier, a second knife blade mounted on said arm, a fluid operated cylinder having a piston connected to said second knife carrier whereby the latter is driven by said piston, a linkage connecting said knife carriers to reciprocate said carriers simultaneously in opposite directions so as to cause said blades to close together across the conveyor and to open to a position in which said strip may pass between them, a pair of inlet valves connected to said cylinder and adapted, when closed, to prevent movement of said piston in a direction to close said blades together, and a pair of guard members normally engaging said valves and holding them open, said members being movable away from said valves to allow the latter to close.

8. A cutting device as described in claim 7, said linkage comprising a first rack on said first carrier, a second rack on said second carrier and a pinion engaging both said racks.

References Cited in the file of this patent

UNITED STATES PATENTS

| | | |
|---|---|---|
| 1,755,061 | Hegg | Apr. 15, 1930 |
| 1,844,766 | Keller | Feb. 9, 1932 |
| 2,101,570 | Bolen | Dec. 7, 1937 |
| 2,324,660 | Yanchenko | July 20, 1943 |
| 2,703,536 | Baker | Mar. 8, 1955 |